United States Patent
Shen (10) Patent No.: US 10,027,135 B2
(45) Date of Patent: Jul. 17, 2018

(54) APPARATUS FOR BALANCING BATTERY POWER

(71) Applicant: Silergy Semiconductor Technology (Hangzhou) LTD, Hangzhou, ZheJiang Province (CN)

(72) Inventor: Zhiyuan Shen, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 137 days.

(21) Appl. No.: 15/262,781

(22) Filed: Sep. 12, 2016

(65) Prior Publication Data

US 2017/0093183 A1    Mar. 30, 2017

(30) Foreign Application Priority Data

Sep. 30, 2015 (CN) .......................... 2015 1 0639339

(51) Int. Cl.
*H02J 7/00* (2006.01)

(52) U.S. Cl.
CPC ............ *H02J 7/0016* (2013.01); *H02J 7/007* (2013.01); *H02J 7/0019* (2013.01); *H02J 7/0021* (2013.01)

(58) Field of Classification Search
CPC .................................................. H02J 7/0016
USPC ....................................................... 320/134
See application file for complete search history.

(56) References Cited

U.S. PATENT DOCUMENTS

| 7,081,737 B2* | 7/2006 | Liu ..................... H01M 10/441 320/130 |
| 8,432,104 B2 | 4/2013 | Hu et al. |
| 9,048,669 B2* | 6/2015 | Lim ..................... H02J 7/0019 |
| 2005/0077875 A1 | 4/2005 | Bohley |
| 2011/0025125 A1* | 2/2011 | Brabec ................ B60L 11/1861 307/9.1 |
| 2014/0163910 A1 | 6/2014 | Yu et al. |

FOREIGN PATENT DOCUMENTS

CN    102170029 A    8/2011

* cited by examiner

*Primary Examiner* — Suresh Memula
(74) *Attorney, Agent, or Firm* — Michael C. Stephens, Jr.

(57) ABSTRACT

An apparatus for balancing battery power can include: a battery selection circuit coupled to N batteries, where the battery selection circuit is configured to couple one of the N batteries to a charge and discharge port, where N is an integer greater than 1; a bi-directional power converter having a first terminal coupled to the charge and discharge port, and a second terminal coupled to a storage capacitor; N detection circuits corresponding to the N batteries, where each of the N detection circuits is configured to detect a state of a corresponding of the N batteries; and a control circuit configured to control the battery selection circuit to couple a selected battery to the charge and discharge port, and to charge or discharge the selected battery through the bi-directional power converter to maintain a voltage of the storage capacitor to be within a predetermined range.

12 Claims, 7 Drawing Sheets

FIG. 1 (conventional)

APPARATUS FOR BALANCING BATTERY POWER

RELATED APPLICATIONS

This application claims the benefit of Chinese Patent Application No. 201510639339.0, filed on Sep. 30, 2015, which is incorporated herein by reference in its entirety.

FIELD OF THE INVENTION

The present invention generally relates to the field of power electronics, and more particularly to an apparatus for balancing battery power.

BACKGROUND

Figure 1:
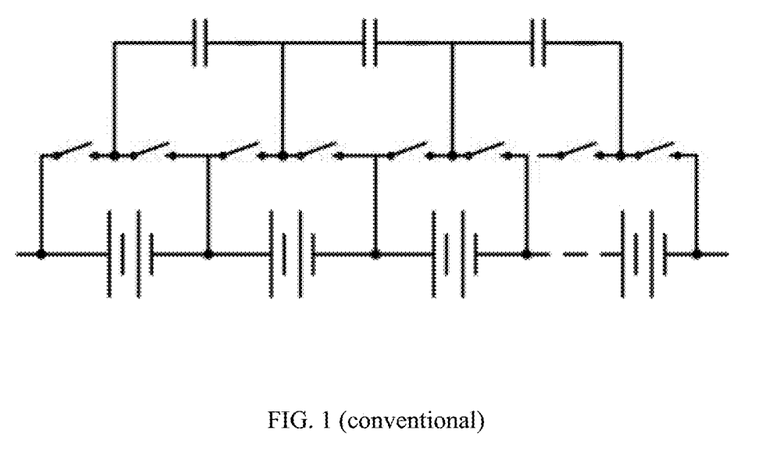
FIG. 1 is a schematic block diagram of a conventional apparatus for balancing battery power.

With the increasing power of consumer electronics, the capacity of a battery pack applied in such consumer electronics is also increasing. Typically, a battery pack with a relatively large capacity may include several batteries. Thus, different batteries should be balanced during the operation process, in order to improve the utilization factor of the batteries. In addition, some of the batteries should be protected against being over-charged or over-discharged, as it may shorten the battery lifetime. As shown in the conventional scheme of FIG. 1, the batteries are balanced by using capacitors and related switch loops coupled between every two adjacent batteries. However, such approaches can only exchange energy between adjacent batteries, and are unable to freely exchange energy between all of the batteries. Moreover, a large number of capacitors are needed in this type of arrangement, so the efficiency may be relatively low as the charge transfer efficiency equals to a ratio of a voltage of one battery with a lower charge to a voltage of another battery with a higher charge.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, an apparatus for balancing battery power can include: (i) a battery selection circuit coupled to N batteries, where the battery selection circuit is configured to couple one of the N batteries to a charge and discharge port, where N is an integer greater than 1; (ii) a bi-directional power converter having a first terminal coupled to the charge and discharge port, and a second terminal coupled to a storage capacitor; (iii) N detection circuits corresponding to the N batteries, where each of the N detection circuits is configured to detect a state of a corresponding of the N batteries; and (iv) a control circuit configured to control the battery selection circuit to couple a selected battery to the charge and discharge port, and to charge or discharge the selected battery through the bi-directional power converter to maintain a voltage of the storage capacitor to be within a predetermined range.

Figure 2:
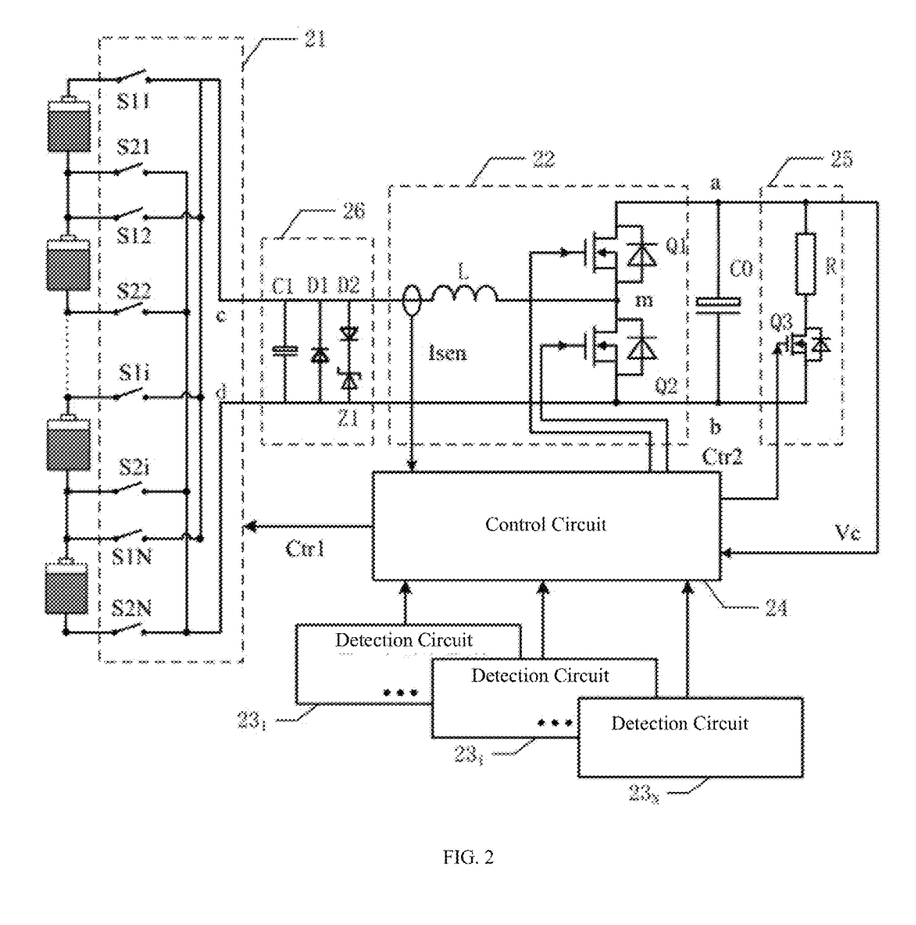
FIG. 2 is a schematic block diagram of an example apparatus for balancing battery power, in accordance with embodiments of the present invention.

Referring now to FIG. 2, shown is a schematic block diagram of an example apparatus for balancing battery power, in accordance with embodiments of the present invention.

In this particular example, the apparatus for balancing battery power may include battery selection circuit 21, storage capacitor CO, bi-directional power converter 22, N detection circuits $23_1$-$23_N$, and control circuit 24, where N is an integer greater than 1. Battery selection circuit 21 can connect to N batteries, and may be used for selecting one of the N batteries to be coupled to a charge and discharge port "cd."

For example, battery selection circuit 21 is a switch loop coupled to all batteries, and certain batteries can be coupled to the charge and discharge port "cd" by turning some switches on and some switches off according to appropriate switch instructions/signals. For example, battery selection circuit 21 may include N switches S11-S1N and N switches S21-S2N. Each of switches S1$i$ can be controlled by control circuit 24, and may have a terminal coupled to an anode of a corresponding battery, and a second terminal coupled to terminal "c" of the charge and discharge port.

Each of switches S2$i$ controlled by control circuit 24 may have a first terminal coupled to a cathode of a corresponding battery and a second terminal coupled terminal "d" of the charge and discharge port. In this example arrangement, the $i^{th}$ battery can be coupled to the charge and discharge port by turning on switch S1$i$ and switch S2$i$ that are respectively coupled to the anode and cathode of the battery, and turning off the remaining switches. In this way, the battery level can be regulated by coupling any battery to the charge and discharge port through a simple switch loop. Thus, the circuit of particular embodiments is relatively simple and cost effective.

Figure 3:
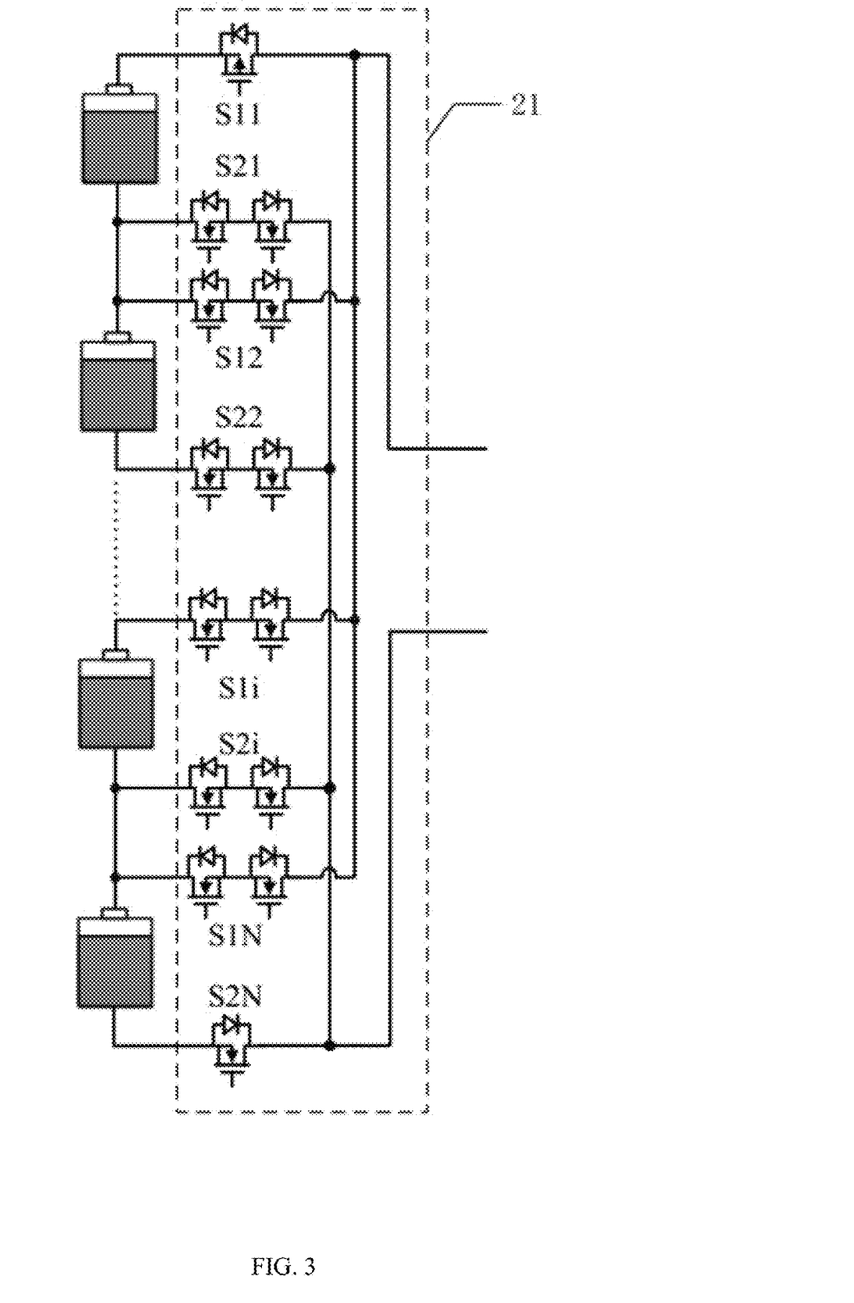
FIG. 3 is a schematic block diagram of an example battery selection circuit, in accordance with embodiments of the present invention.

Referring now to FIG. 3, shown is a schematic block diagram of an example battery selection circuit, in accordance with embodiments of the present invention. In this particular example, because the second terminals of all switches S1$i$ are coupled together, the i$^{th}$ switch can be coupled to the anode of the i$^{th}$ battery, and the (i+1)$^{th}$ switch can be coupled to the cathode of the i$^{th}$ battery. Thus, the anode and the cathode of the i$^{th}$ battery can be directly coupled through the i$^{th}$ switch and the (i+1)$^{th}$ switch. When a single MOS transistor is configured as a switch device, the body diode of the MOS transistor can reversely conduct. Thus, the i$^{th}$ battery may be shorted when both the i$^{th}$ switch and the (i+1)$^{th}$ switch are on. Similarly, the second to N$^{th}$ batteries may also be shorted because of the same reason.

In addition, the first to the (N-1)$^{th}$ batteries may be shorted when the first to the (N-1)$^{th}$ switches are single MOS transistors. Therefore, in order to protect the batteries, each of the second to the N$^{th}$ switches S1$i$ can be implemented by two MOS transistors that are reversely coupled in series, and each of the first to (N-1)$^{th}$ switches S2$i$ can also be implemented by two MOS transistors that are reversely coupled in series. The body diodes of two reversely coupled MOS transistors have opposite directions, thus the diodes may not be conducting when the transistors are off, in order to prevent the transistors from being shorted. In this way, the batteries in the battery pack can be well protected. Also, the 1$^{st}$ switch (e.g., S11) and the N$^{th}$ switch (e.g., S2N) can use the same type as the other switches, or may each use single MOS transistors in order to reduce the circuit dimension.

Referring back to FIG. 2, storage capacitor C0 with a relatively large capacity may store electric energy during the battery level balancing process. For example, storage capacitor C0 can receive electric energy from the battery with a higher charge, and may release the received electric energy to the battery with a lower charge. Bi-directional power converter 22 is a two-port circuit having a first port coupled to the charge and discharge port "cd," and a second port coupled to storage capacitor C0. For example, bi-directional power converter 22 is a switch-type converter, and may include inductor L and power switches Q1 and Q2.

Inductor L can be coupled between terminal "c" of the first port and a middle terminal "m." Power switch Q1 can connect between terminal "a" of the second port and terminal "m," and power switch Q2 can connect between terminal "m" and terminal "b" of the second port. Terminal "b" of the second port can be coupled to terminal "d" of the first port, as a reference point of the circuit. Bi-directional power converter 22 can perform power conversion from port "cd" to port "ab," or from port "ab" to port "cd" by controlling power switches Q1 and Q2. Bi-directional power converter 22 may operate in a boost mode when charging storage capacitor C0, and may operate in a buck mode when charging the batteries through storage capacitor C0.

Detection circuits 23$_1$-23$_N$ that correspond to N batteries can detect the status of corresponding batteries. In this particular example, detection circuit 23$_i$ may detect the state of charge of a corresponding battery and output the detection result to control circuit 24. However, different status parameters or more status parameters can be detected as references for batteries to be coupled in different approaches for balancing battery power. Control circuit 24 may generate control signals Ctr1 to control battery selection circuit 21 to couple an appropriate battery to the charge and discharge port "cd," and generate control signals Ctr2 to control bi-directional power converter 22 to charge and discharge the battery which is coupled to the charge and discharge port. In this way, the battery power can be balanced by maintaining the voltage fluctuation of the storage capacitor to be within a predetermined range.

Figure 4:
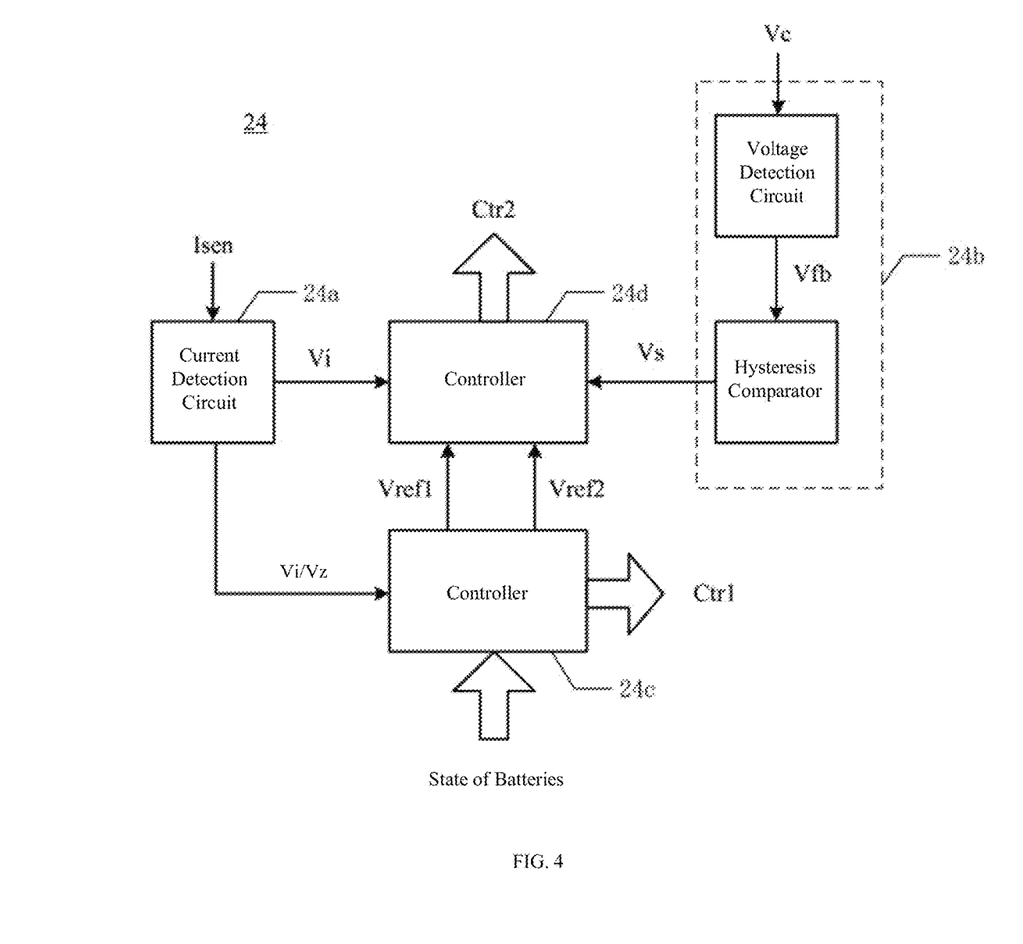
FIG. 4 is a schematic block diagram of an example control circuit in an apparatus for balancing battery power, in accordance with embodiments of the present invention.

Referring now to FIG. 4, shown is a schematic block diagram of an example control circuit in an apparatus for balancing battery power, in accordance with embodiments of the present invention. In this particular example, control circuit 24 may include current detection circuit 24$a$, voltage hysteresis comparators 24$b$, and control circuits 24$c$ and 24$d$. Current detection circuit 24$a$ may receive current sampling signal Isen, which can be obtained by detecting a current through the charge and discharge port "cd" (e.g., a current flowing into or out of terminal c or terminal d), in order to obtain current detection signal Vi.

Voltage hysteresis comparator 24$b$ may detect voltage Vc of the storage capacitor and output voltage status signal Vs. Voltage status signal Vs can be switched to a first state when voltage Vc of the storage capacitor is reduced to be less than lower threshold V1, and may be switched to a second state when voltage Vc of the storage capacitor is increased to be greater than upper threshold V2. For example, voltage hysteresis comparator 24$b$ may include a voltage detection circuit and a hysteresis comparator. The voltage detection circuit may detect a voltage across the storage capacitor, in order to generate voltage detection signal Vfb.

The hysteresis comparator may generate voltage status signal Vs according to voltage detection signal Vfb. Voltage status signal Vs may be switched from the second state to the first state when voltage Vc of the storage capacitor is reduced to be less than lower threshold V1, and switched from the first state to the second state when voltage Vc of storage capacitor C0 is increased to be greater than upper threshold V2. For example, the hysteresis comparator may be a comparator having two reversal voltages when it is used to compare in two opposite directions.

Controller 24$c$ may obtain the battery status, and control the battery selection circuit. For example, controller 24$c$ may control the battery selection circuit according to the status of all batteries to couple an appropriate battery to the charge and discharge port "cd," and to generate current reference signals Vref1 and Vref2. Current reference signal Vref1 may represent the discharge current reference of the battery being coupled to the charge and discharge port, and current reference signal Vref2 may represent the charge current reference of the battery being coupled to the charge and discharge port.

Current reference signal Vref1 can be a positive value that represents the expected input current. Bi-directional power converter 22 may charge storage capacitor Co by a current obtained from the battery when bi-directional power converter 22 is controlled according to current reference signal Vref1. Current reference signal Vref2 can be a negative value that represents the expected output current. Bi-directional power converter 22 can charge the battery by a current obtained from storage capacitor C0 when bi-directional power converter 22 is controlled according to current reference signal Vref2.

Controller 24$d$ may control the bi-directional power converter according to current detection signal Vi, current reference signal Vref1, current reference signal Vref2, and voltage status signal Vs. For example, controller 24$d$ may control the switch of the current reference signals according to voltage status signal Vs, so as to control the charge and discharge directions. For example, controller 24$d$ may control the bi-directional power converter with a target of regulating current detection signal Vi to be relatively close to (e.g., within a predetermined range of) current reference signal Vref when voltage status signal Vs is in the first state when voltage Vc of the storage capacitor reaches the upper threshold. Controller 24$d$ may also control the bi-directional power converter with a target of regulating current detection signal Vi to be relatively close to (e.g., within a predetermined range of) current reference signal Vref2 when voltage status signal Vs is in the second state when voltage Vc of the storage capacitor is reduced to the lower threshold. Current reference signal Vref1 can be a positive value, and current reference signal Vref2 may be a negative value.

Controller 24d may generate control signals Ctr2 in a peak current control mode according to current detection signal Vi and current reference signal Vref1 or Vref2, so as to control the power switch of the bi-directional power converter. Thus, through the cooperation of controllers 24c and 24d, the battery power can be balanced by discharging the battery coupled to the charge and discharge port, storing energy in the storage capacitor, and charging a corresponding battery that is coupled to the charge and discharge port by using the stored energy. For example, controller 24c may alternatively select the batteries that need to be charged or discharged to be coupled to the charge and discharge port "cd."Further, controller 24c may alternatively select the battery with the maximum state of charge (SOC) and the battery with the minimum SOC to be coupled to the charge and discharge port "cd."Controller 24d may switch the current reference signals as a control target when the state of voltage status signal Vs is switched, such that the operation state of the power converter may change along with the voltage status signal.

The current at the charge and discharge port may gradually fall to zero and close to the control target in a reverse direction instead of turning over immediately after controller 24d switches the current reference signal to be the control target. In order to charge the battery that needs to be charged, and to discharge the battery that needs to be discharged immediately once they are coupled to the circuit, controller 24c may control the battery selection circuit to switch the batteries to be coupled to the charge and discharge port when current detection signal Vi crosses zero. The above can be achieved through zero crossing detection by controller 24c according to current detection signal Vi.

Alternatively, this can be achieved through zero crossing detection by current detection circuit 24a, and zero crossing signal Vz indicative of the zero crossing point can be input to controller 24c. In such a case, the efficiency of balancing the battery power can be improved to the maximum extent, and the battery can be protected by switching the control targets of the bi-directional power converter according to the voltage status of the storage capacitor, and by switching the batteries according to the current zero crossing point.

Figure 5:
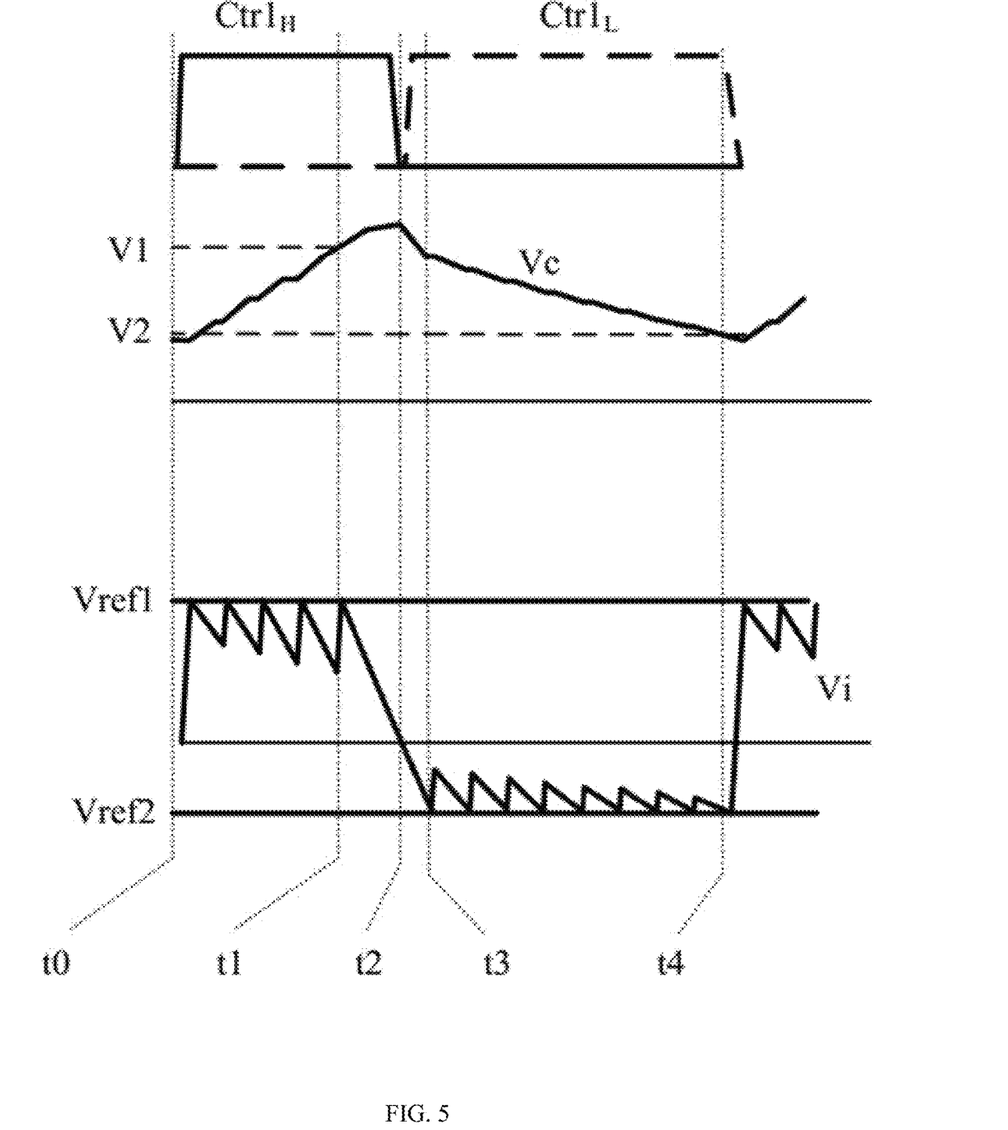
FIG. 5 is a waveform diagram of example operation of an apparatus for balancing battery power, in accordance with embodiments of the present invention.

Referring now to FIG. 5, shown is a waveform diagram of example operation of an apparatus for balancing battery power, in accordance with embodiments of the present invention. In this particular example, controller 24c may obtain the state of charge by detecting the state of the battery through the battery detection circuit. At time t0, controller 24c may control battery selection circuit 21 to couple the battery with the maximum SOC to the charge and discharge port "cd."At this time, control signals $Ctr1_H$ of the switches that correspond to the battery with the maximum SOC can be at a high level.

In addition, current reference signals Vref1 and Vref2 can be determined by controller 24c according to the related parameters of the present coupled battery. In this example, controller 24d may take current reference signal Vref1 as the control target after time t0. Thus, the coupled battery can be taken as the input source for bi-directional power converter 22 to charge storage capacitor C0, and thus voltage Vc of the storage capacitor may gradually rise. At time t1, voltage Vc of the storage capacitor may reach the upper threshold, so voltage status signal Vs generated by voltage hysteresis comparator 24b can be switched to the second state. Controller 24d may take current reference signal Vref2 as the control target, and the inductor current can begin to decrease from near the current value corresponding to current reference signal Vref1 until becoming relatively close to current reference signal Vref2. However, voltage Vc of storage capacitor C0 may still rise for some time since the current still flows into storage capacitor C0 when the inductor current is decreasing.

At time t2, when the inductor current is decreased to zero, controller 24c generate control signals $Ctr1_L$ of the switches that correspond to the battery with the lowest SOC to be at a high level. In such case, the battery can operate as the load of the bi-directional power converter, and the storage capacitor can be used to charge the battery via the bi-directional power converter. Also, the inductor current may turn over and voltage Vc of the storage capacitor can gradually decrease. In such manner, the voltage of the storage capacitor may be limited to be within a predetermined range.

At time t3, current detection signal Vi that represents the inductor current can reach current reference signal Vref2, so as to enter the reverse peak current control stage. At time t4, the voltage of the storage capacitor can be decreased to lower threshold V2. At this time, the battery with the maximum SOC can be coupled to the bi-directional power converter according to the battery state, so as to start a next operation cycle for balancing the battery power. In such manner, the voltage of the storage capacitor can be limited to be within a predetermined range.

In particular embodiments, the apparatus for balancing battery power may also include shunting circuit 25 (see, e.g., FIG. 2) coupled to storage capacitor C0 in parallel, to controllably discharge the storage capacitor. Control circuit 24 may control the shunting circuit to discharge the storage capacitor when the state of charge or the state of the charging current of the present battery in the charging state that is coupled to the charge and discharge port satisfies the shunting condition. The shunting condition can include the state of the charge of the battery being higher than a predetermined threshold, or the charging current of the battery being higher than a predetermined threshold. For example, shunting circuit 25 may include resistor R and switch Q3 (e.g., a MOS transistor, a triode, etc.) connected in series. Controller 24c in control circuit 24 may control switch Q3 according to the state of the battery, so as to discharge the storage capacitor. In this way, the lifetime of the batteries can be prolonged by avoiding over-charging of the batteries.

In particular embodiments, the apparatus for balancing battery power can also include clamping circuit 26 coupled to the charge and discharge port. The clamping circuit may provide a freewheeling loop for the inductor current during the dead time of the switching operation. For example, the clamping circuit may include capacitor C1, diodes D1 and D2, and zener diode Z1. Capacitor C1 and diode D1 can be respectively coupled to the charge and discharge port, and diode D2 and zener diode Z1 can be coupled in series to the charge and discharge port. The reverse coupled diode D1 may o provide a positive freewheeling loop for the inductor current. Diode D2 and zener diode Z1 may provide a negative freewheeling loop for the inductor current.

In this way, the voltage of the storage capacitor can remain within a predetermined range by coupling an appropriate battery that meets a certain condition to the charge and discharge port. Also, charging or discharging the coupled battery through the bi-directional power converter according to the energy stored in the storage capacitor can effectively balance battery levels between a plurality of batteries by a single stage power converter and relatively simple circuitry.

Figure 6:
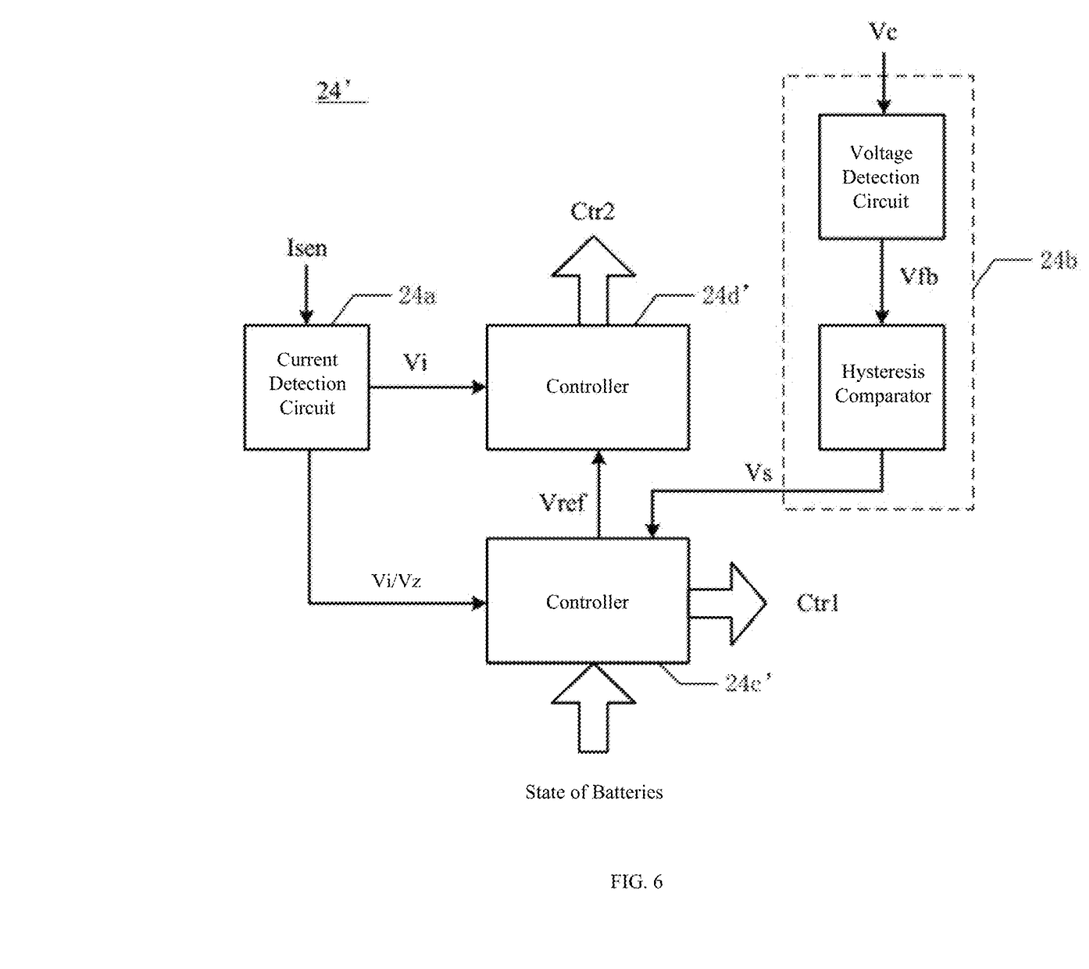
FIG. 6 is a schematic block diagram of an example control circuit in an apparatus for balancing battery power, in accordance with embodiments of the present invention.

Referring now to FIG. 6, shown is a schematic block diagram of an example control circuit in an apparatus for balancing battery power, in accordance with embodiments of the present invention. In this particular example, control circuit 24' may include current detection circuit 24a, voltage hysteresis comparator 24b, and controllers 24c' and 24d'. Current detection circuit 24a and voltage hysteresis comparator 24b are similar to the embodiment as described above, and will not be explained herein.

Controller 24c may generate two current reference signals Vref1 and Vref2 to controller 24d. Controller 24d may choose one of the two current reference signals as a control target according to voltage status signal Vs, so as to generate control signal Ctr2 for the bi-directional power converter. In this particular example, controller 24c' only generate one current reference signal Vref to controller 24d', and controller 24d' may take current reference signal Vref as the control target, so as to control the bi-directional power converter. Also, current detection signal Vi can be controlled to be relatively close to (e.g., within a predetermined range of) current reference signal Vref.

Controller 24c' may switch the values of current reference signal Vref according to voltage status signal Vs. For example, current reference signal Vref of a first value can be generated when voltage status signal Vs is in the first state when voltage Vc of the storage capacitor is decreased to the lower threshold, and current reference signal Vref of a second value can be generated when voltage status signal Vs is in the second state when voltage Vc of the storage capacitor is increased to the upper threshold. The first value may be a discharge current reference of the battery that is coupled to the charge and discharge port, and the second value can be a charge current reference of the battery that is coupled to the charge and discharge port.

In this particular example, the control targets may be switched according to voltage status signal Vs through controller 24c'. Accordingly, voltage hysteresis comparator 24b may provide voltage status signal Vs to controller 24c'. Controller 24c' may alternatively select the batteries that need to be charged or discharged to be coupled to the charge and discharge port cd. Furthermore, controller 24c' may alternatively select the battery with the maximum SOC and the battery with the minimum SOC to be coupled to the charge and discharge port "cd."

The current at the charge and discharge port may gradually fall to zero and close to the control target in a reverse direction instead of turning over immediately after controller 24c' switches the current reference signal to be the control target. In order to charge the battery that needs to be charged, and to discharge the battery that needs to be discharged immediately once they are coupled to the circuit, controller 24c' may control the battery selection circuit to switch the batteries to be coupled to the charge and discharge port when current detection signal Vi crosses zero. The above can be achieved through zero crossing detection by controller 24c' according to current detection signal Vi. Alternatively, this can be achieved through zero crossing detection by current detection circuit 24a, and zero crossing signal Vz indicative of the zero crossing point may be provided to controller 24c'.

Figure 7:
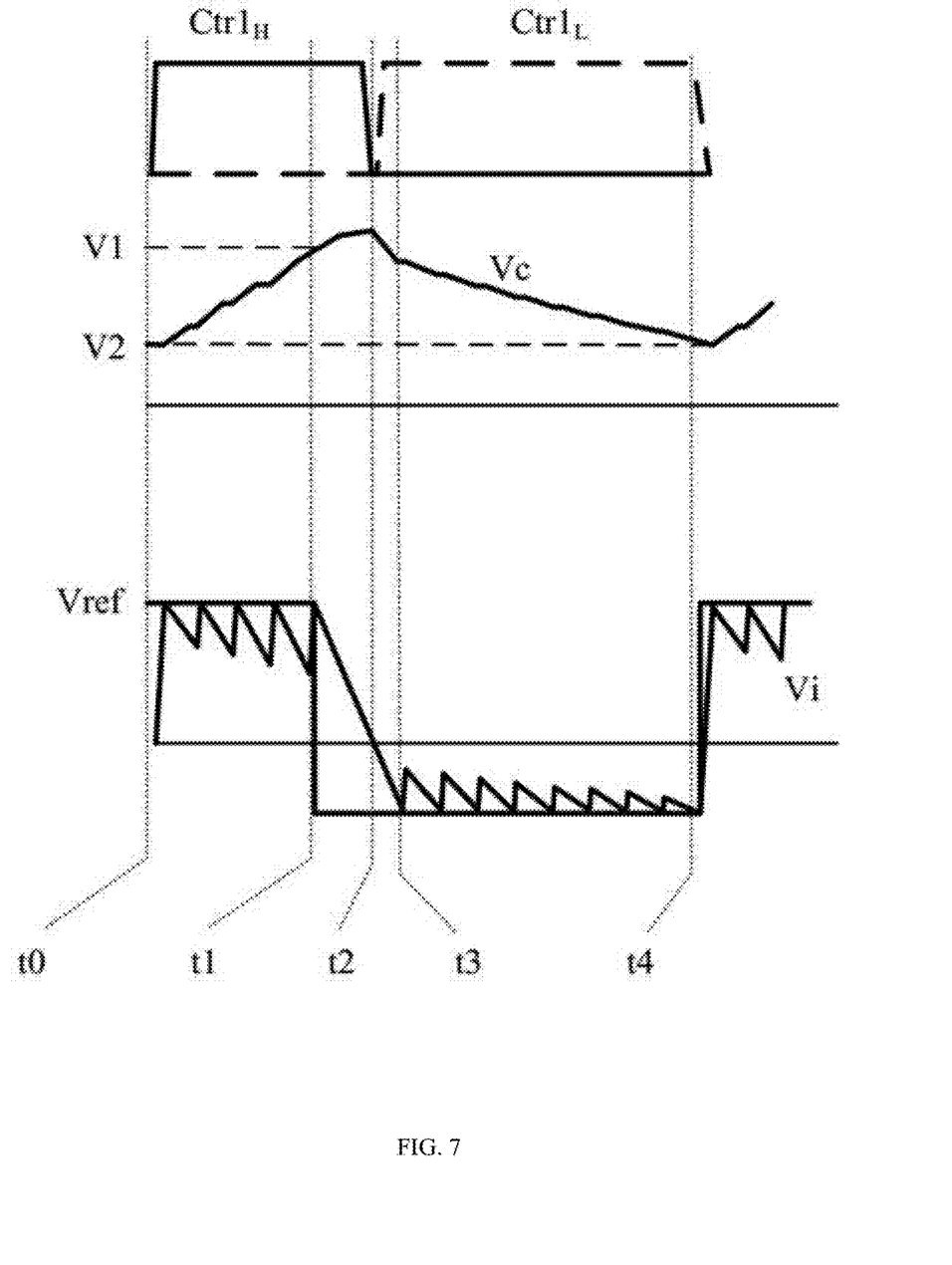
FIG. 7 is a waveform diagram of example operation of an apparatus for balancing battery power, in accordance with embodiments of the present invention.

Referring now to FIG. 7, shown is a waveform diagram of example operation of an apparatus for balancing battery power, in accordance with embodiments of the present invention. In this particular example, controller 24c' may obtain the state of charge by detecting the state of the battery through the battery detection circuit. At time t0, controller 24c' may control battery selection circuit 21 to couple the battery with the maximum SOC to the charge and discharge port "cd." At this time, control signals $Ctr1_H$ of the switches that corresponding to the battery with the maximum SOC can be at a high level, and current reference signal Vref of a first value may be generated. The value of current reference signal Vref can be determined by controller 24c according to the related parameters of the present coupled battery. In this example, controller 24d' may take current reference signal Vref of the first value as the control target after time t0, so the coupled battery can be taken as the input source for bi-directional power converter 22 to charge storage capacitor C0, and thus voltage Vc of storage capacitor may gradually rise.

At time t1, voltage Vc of the storage capacitor may reach upper threshold V1, so voltage status signal Vs generated by voltage hysteresis comparator 24b may be switched to the second state, and controller 24c' switches current reference signal Vref to the second value and provided to controller 24d'. The inductor current may then begin to decrease from near the current value corresponding to the first value to be relatively close to the second value. However, voltage Vc of storage capacitor C0 may still rise for some time since the current still flows into storage capacitor C0 when the inductor current is decreasing.

At time t2, when the inductor current is decreased to zero, controller 24c' can generate control signals $Ctr1_L$ of the switches that corresponding to the battery with the lowest SOC to be at a high level. In such case, the battery may operate as the load of the bi-directional power converter, the storage capacitor can be used to charge the battery via the bi-directional power converter, and the inductor current may turn over such that voltage Vc of the storage capacitor gradually decreases. In such manner, the voltage of the storage capacitor may be limited to be within a predetermined range.

At time t3, current detection signal Vi that represents the inductor current can reach the second value, so as to enter the reverse peak current control stage. At time t4, the voltage of the storage capacitor may be decreased to lower threshold V2. At this time, the battery with the maximum SOC can be coupled to the bi-directional power converter according to the battery state, so as to begin a next operation cycle for balancing the battery power. In such manner, the voltage of the storage capacitor may be limited to be within a predetermined range, and battery power can be substantially balanced.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus for balancing battery power, the apparatus comprising:
   a) a battery selection circuit coupled to N batteries, wherein said battery selection circuit is configured to couple one of said N batteries to a charge and discharge port, wherein N is an integer greater than 1;
   b) a bi-directional power converter having a first terminal coupled to said charge and discharge port, and a second terminal coupled to a storage capacitor;

c) N detection circuits corresponding to said N batteries, wherein each of said N detection circuits is configured to detect a state of a corresponding of said N batteries; and d) a control circuit configured to control said battery selection circuit to couple a selected battery to said charge and discharge port, and to charge or discharge said selected battery through said bi-directional power converter to maintain a voltage of said storage capacitor to be within a predetermined range.

2. The apparatus of claim 1, wherein said battery selection circuit comprises:

a) N first switches controlled by said control circuit, wherein each of said first switches comprises a first terminal coupled to an anode of a corresponding battery, and a second terminal coupled to a first terminal of said charge and discharge port; and b) N second switches controlled by said control circuit, wherein each of said second switches comprises a first terminal coupled to a cathode of a corresponding battery, and a second terminal coupled to a second terminal of said charge and discharge port.

3. The apparatus of claim 2, wherein:

a) each of the $2^{nd}$ to the $N^{th}$ first switches comprises two MOS transistors that are reversely coupled in series; and b) each of the $1^{st}$ to the $(N-1)^{th}$ second switches comprises two MOS transistors that are reversely coupled in series.

4. The apparatus of claim 1, wherein said control circuit comprises:

a) a current detection circuit configured to obtain a current detection signal by detecting a current flowing through one terminal of said charge and discharge port;

b) a voltage hysteresis comparator configured to generate a voltage status signal by detecting said voltage of said storage capacitor, wherein said voltage status signal is switched to a first state when said voltage of said storage capacitor is decreased to be less than a lower threshold, and is switched to a second state when said voltage of said storage capacitor is increased to be greater than a upper threshold;

c) a first controller configured to control said battery selection circuit to couple said selected battery to said charge and discharge port according to said state of said battery, and to generate first and second current reference signals, wherein said first current reference signal represents a discharge current reference of said selected battery, and said second current reference signal represents a charge current reference of said selected battery; and d) a second controller configured to control said bi-directional power converter according to said current detection signal, said first and second current reference signals, and said voltage status signal.

5. The apparatus of claim 4, wherein said second controller is configured to control said bi-directional power converter by enabling said current detection signal to be within a predetermined range of said first current reference signal when said voltage status signal is in said first state, and by enabling said current detection signal to be within a predetermined range of said second current reference signal when said voltage status signal is in said second state.

6. The apparatus of claim 1, wherein said control circuit comprises:

a) a current detection circuit configured to obtain a current detection signal by detecting a current flowing through one terminal of said charge and discharge port;

b) a voltage hysteresis comparator configured to generate a voltage status signal by detecting said voltage of said storage capacitor, wherein said voltage status signal is switched to a first state when said voltage of said storage capacitor is decreased to be less than a lower threshold, and is switched to a second state when said voltage of said storage capacitor is increased to be greater than an upper threshold;

c) a first controller configured to control said battery selection circuit to couple said selected battery to said charge and discharge port according to said state of said battery, and to output a current reference signal according to said voltage status signal; and d) a second controller configured to control said bi-directional power converter by enabling said current detection signal to be within a predetermined range of said current reference signal.

7. The apparatus of claim 6, wherein said first controller is configured to output a current reference signal of a first value when said voltage detection signal is in said first state, and to output a current reference signal of a second value when said voltage detection signal is in said second state, wherein said first value is a discharge current reference of said selected battery, and said second value is a charge current reference of said selected battery.

8. The apparatus of claim 4, wherein said first controller is configured to alternatively couple batteries to be charged and discharged to said charge and discharge port.

9. The apparatus of claim 4, wherein said first controller is configured to control said battery selection circuit to switch batteries being coupled to said charge and discharge port when said current detection signal crosses zero.

10. The apparatus of claim 1, further comprising:

a) a shunting circuit coupled in parallel to said storage capacitor, wherein said shunting circuit is configured to controllably discharge said storage capacitor; and b) said control circuit being configured to control said shunting circuit to discharge said storage capacitor when the state of charge or the state of a charging current of said selected battery satisfies a shunting condition.

11. The apparatus of claim 10, wherein said shunting circuit comprises a resistor and a switch that are coupled in series.

12. The apparatus of claim 1, further comprising a clamping circuit coupled to said charge and discharge port.

* * * * *